US006633277B1

(12) United States Patent
Ivanov

(10) Patent No.: US 6,633,277 B1
(45) Date of Patent: Oct. 14, 2003

(54) COMPACT 3-STATE DATA ENTRY DEVICE

(75) Inventor: Vladimir Ivanov, Maroubra (AU)

(73) Assignee: 3Com Corporation, Santa Clara, CA (US)

( * ) Notice: Subject to any disclaimer, the term of this patent is extended or adjusted under 35 U.S.C. 154(b) by 268 days.

(21) Appl. No.: 09/580,709

(22) Filed: May 30, 2000

(51) Int. Cl.$^7$ ................................................ G09G 5/00
(52) U.S. Cl. ........................ 345/167; 345/168; 345/156; 345/184
(58) Field of Search ................................ 345/156–172, 345/341, 22, 361, 680–683; 341/22; 361/680–683

(56) References Cited

U.S. PATENT DOCUMENTS

| | | | |
|---|---|---|---|
| 4,775,255 A | * 10/1988 | Langley | 400/100 |
| 4,862,166 A | 8/1989 | Yamakawa | 341/22 |
| 5,086,221 A | 2/1992 | Ishihara et al. | 250/231 |
| 5,563,631 A | * 10/1996 | Masunaga | 345/161 |
| 5,660,488 A | * 8/1997 | Miller | 340/407.2 |
| 5,712,760 A | 1/1998 | Coulon et al. | 361/680 |
| 5,754,645 A | 5/1998 | Metroka et al. | 379/433 |
| 5,786,593 A | 7/1998 | Ohtomo et al. | 250/231 |
| 5,788,386 A | 8/1998 | Hayashi et al. | 400/489 |
| 5,790,103 A | 8/1998 | Willner | 345/168 |
| 6,157,323 A | * 12/2000 | Tso et al. | 345/168 |
| 6,215,473 B1 | * 4/2001 | Suzuki | 345/156 |
| 6,370,282 B1 | * 4/2002 | Pavley et al. | 345/716 |

OTHER PUBLICATIONS

IBM Corporation, "*Compact Computer Keyboard*", IBM Technical Disclosure Bulletin, vol. 27 No. 10A, Mar. 1985, pp. 5640–5642.

IBM Corporation, "*Keyboard For Handheld Computer*", IBM Technical Disclosure Bulletin, vol. 27 No. 10A, Mar. 1985, pp. 5643–5645.

R. J. Bamford et al., "*Chord Keyboard With Case Lock And Chord Definition Features*", IBM Technical Disclosure Bulletin, vol. 21 No. 7, Dec. 1978, pp. 2929–2932.

F. C. Bequaert, "*Portable High Speed Keyboard*", IBM Technical Disclosure Bulletin, vol. 23 No. 7A, Dec. 1980, pp. 3016–3018.

R. E. Becon, "*Easy–To–Learn Programmable Keyboard*", IBM Technical Disclosure Bulletin, vol. 24 No. 5, Oct. 1981, p. 2465.

* cited by examiner

*Primary Examiner*—Steven Saras
*Assistant Examiner*—Michael J Moyer
(74) *Attorney, Agent, or Firm*—McDonnell Boehnen Hulbert & Berghoff

(57) ABSTRACT

A data entry system having a base. The base has a plurality of rotatable cylindrical controls. The controls are rotated into a plurality of positions, each of the plurality of positions represent a control sequence. Each control sequence represents one of a plurality of alphanumeric characters. An electrical processor is coupled to the controls and determines the character indicated by the control sequence.

16 Claims, 12 Drawing Sheets

| CODE | POSITION | |
|---|---|---|
| | CONTROL2 | CONTROL1 |
| 0 | A | A |
| 1 | A | B |
| 2 | A | C |
| 3 | B | A |
| 4 | B | B |
| 5 | B | C |
| 6 | C | A |
| 7 | C | B |
| 8 | C | C |

FIG. 6

COMPACT 3-STATE DATA ENTRY DEVICE

FIELD OF THE INVENTION

This present invention relates to keyboards. More specifically, it relates to a compact data entry system that can be used with a variety of devices to enter data at high data entry rates.

BACKGROUND OF THE INVENTION

A variety of keyboards exist that allow users to enter data. For example, one of the more common forms of keyboards is a typewriter keyboard. In the past, the "standard" typewriter keyboard was used with typewriters or other mechanical devices to enter data. Presently, the "standard" typewriter keyboard is used with personal computers and other types of electronic data entry equipment.

The standard typewriter keyboard is also known as the QWERTY keyboard. The QWERTY keyboard is named after the first six characters on the first row of the keyboard. The keyboard was specifically designed to avoid the mechanical jamming of keys in a mechanical typewriter. That is, if two keys were close together in a typewriter keyboard and pressed nearly simultaneously, the keys would jam. Many typists have memorized the pattern of this keyboard. As such, the QWERTY keyboard has become popular for data entry and is used with many computers and other types of electronic data entry equipment.

In addition to the relative positioning of the keys, another concern in data entry applications is the distance between keys. In other words, it has been found that the size of the keys and their spacing affects data entry speeds. Specifically, it has been found that when the keys are too small or are placed too closely together or too far apart, the rate of data entry decreases.

In recent years there has been a proliferation of small hand-held electronic devices where data can be entered for a variety of purposes. For example, small hand-held electronic schedulers allow a user to maintain a schedule, schedule meetings, a keep track of important addresses and telephone numbers. These schedulers are small, allowing them to be portable and fit, for example, in the shirt pocket of a user.

The proliferation of small hand-held devices has raised concerns about decreased data entry speeds. Users often desire to enter a high volume of information in their small hand-held devices. However, since the devices are small, it is sometimes difficult to supply all the so characters of the QWERTY keyboard. When keys for all the characters from the QWERTY keyboard are supplied in such an application, it has been found that data entry rates are lowered due to the difficulty of selecting and pressing the keys on the keyboard since the keys are typically tightly spaced.

It would be desirable to have a small data entry device that is easy to use. It would also be desirable to have a data entry device with a reduced number of keys or controls that is practical to use with small hand-held devices. In addition, it would be desirable if a small, compact data entry device was available that permits the entry of a variety of characters, for example, all the characters on the QWERTY keyboard.

SUMMARY OF THE INVENTION

The invention relates to compact data entry devices that are easy to use and that use a minimum number of controls. Specifically, the invention relates to a small keyboard that is arranged in a diamond-shaped pattern whereby the user can press the keys in sequence and/or together to represent alphanumeric characters.

In one embodiment of the present invention, a small data entry device is used by a user to enter alphanumeric characters. A plurality controls are placed on the device, for example, four keys. The controls are arranged in a compact pattern, for example, the shape of a diamond. Each control can be turned into a plurality of positions, for example, three positions. The user turns one or several of the controls. The turned controls represent a unique alphanumeric character. For example, on a device with four controls, a first control and a second control may be turned simultaneously to represent the letter "R".

The turned controls produce electrical signals. The electrical signals are processed by a processor. A set of indices corresponding to these electrical signals is produced by the processor.

A table in a memory comprises a plurality of codes. The codes relate to a particular grouping ("sequence") of turned controls. For example, a particular code may correspond to the first control being turned to a first position, a second control being turned to a second position, and all other controls being unturned and left in a third (default) position. The table, contained in the memory, is accessed, and the indices used to obtain the corresponding code. The code represents the unique alphanumeric character entered by the user.

The code can then be used by other parts of a system to display the alphanumeric character. For example, the code can be used by a graphics processor to display the alphanumeric character on a screen. Alternatively, the code may be stored in any type of memory for later use.

In another embodiment of the present invention, the controls on the device are cylinders and can be rotated into a plurality of positions. The controls are placed in wells in the device so that they can rotate about a wire along horizontal axis. A wire extends through the control and the control rotates about the wire. The controls are coupled to interface circuits, which detect the particular position of the control.

The controls are in an initial position where no voltage is produced. The control can then be rotated into a first position and a logic one can be produced (e.g., a high voltage level.). Alternatively, the control can also be rotated to a second position and a logic zero may be produced (e.g., a low voltage level). After the control has been positioned in either of the two position, the control returns to its initial position. The combination of different positions produce electrical signals representative of a character.

The interface circuits detect which of the first and second positions the control has been rotated. After the controls have been rotated into position, then the interface circuit detects the position of the control and converts this position into an electrical signal. An electrical signal is produced for each control. The signals are processed and a look-up table is used to convert the electrical signals into a code, as described above. The code represents a unique alphanumeric character. The code can be used by a graphics processor to display the alphanumeric character that is represented by the code. A voltage level is not produced by the third position. Of course, any number of voltage levels may be produced depending upon the number of positions of the control.

In yet another embodiment of the present invention, the device is coupled to a screen. The screen can be part of a small, hand-held device such as a scheduler. The screen has an associated graphics processor. The graphics processor is used to display the alphanumeric characters entered by the device. The screen and the device may be part of any type of data entry system, for example, a small, hand-held data entry device.

BRIEF DESCRIPTION OF THE DRAWINGS

Preferred embodiments of the present inventions are described with reference to the following drawings, wherein:

FIG. 6 is a look-up table according to principles of the present invention;

DETAILED DESCRIPTION OF PREFERRED EMBODIMENTS

Figure 1:
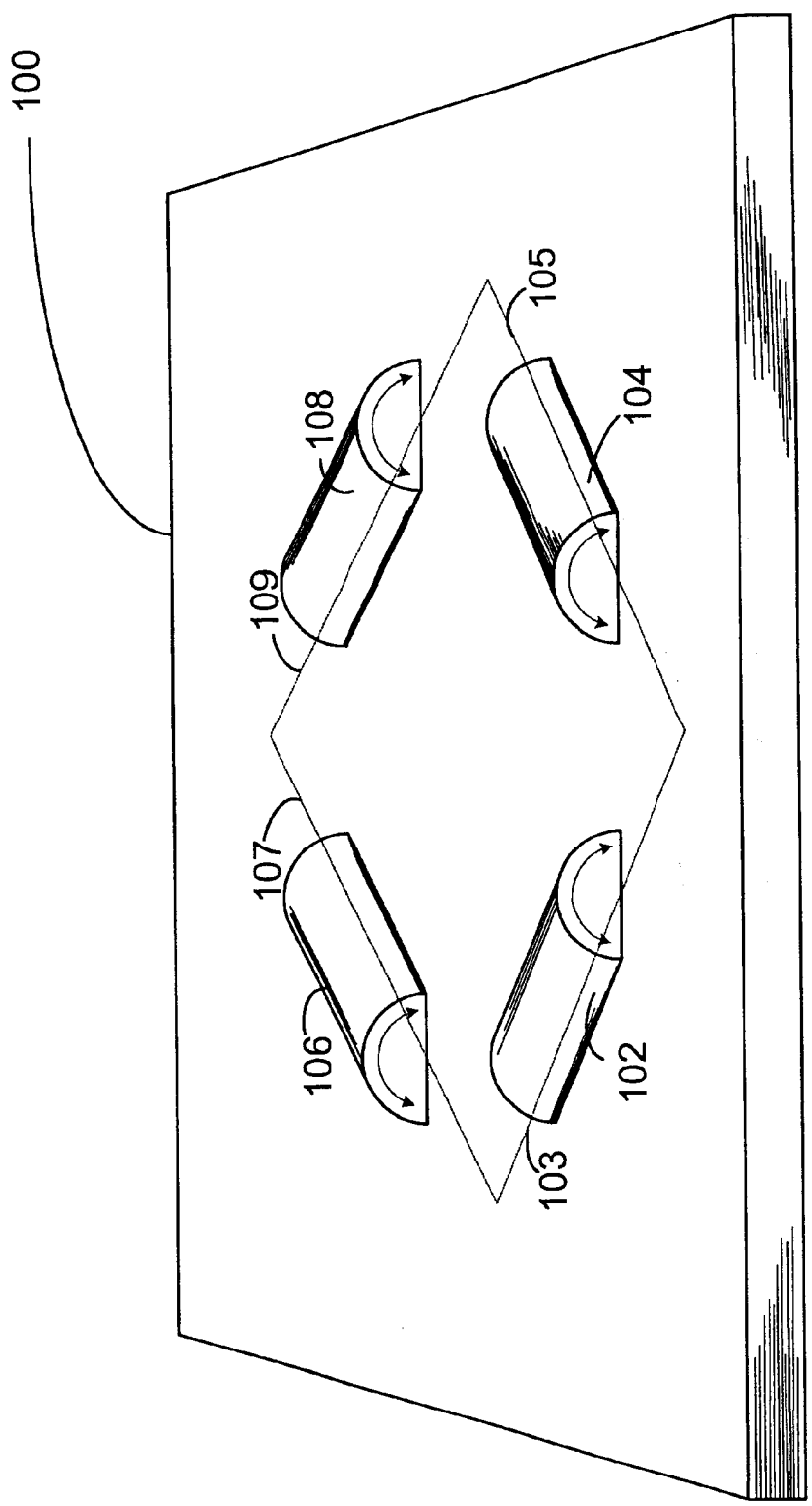
FIG. 1 is a diagram illustrating a perspective diagram illustrating an embodiment of a device according to principles of the present invention.

Referring now to FIG. 1, a base 100 is composed above a first control 102, a second control 104, a third control 106, and a fourth control 108. The controls 102, 104, 106, and 108 are cylinders that rotate about horizontal axes 103, 105, 107, and 109, respectively.

The axes are arranged in a diamond-shape. That is, the axes 103, 105, 107, and 109 form a parallelogram whereby the axis 103 is parallel to the axis 109, and the axis 105 is parallel to the axis 107. The axis 103 may be perpendicular to the axis 105; however, the axis 103 may be arranged at an angle other than ninety degrees with respect to the axis 105. Similarly, the axis 105 may be perpendicular to the axis 109; however, the axis 105 may be arranged at an angle other than ninety degrees with respect to the axis 109. Also, the axis 107 may be perpendicular to the axis 109; however, the axis 107 may be arranged at an angle other than ninety degrees with respect to the axis 109. Finally, the axis 107 may be perpendicular to the axis 103; however, the axis 107 may be arranged at an angle other than ninety degrees with respect to the axis 103.

The controls 102, 104, 106, and 108 rotate into a plurality of positions. For example, the controls 102, 104, 106, and 108 may be turned into one of three positions. The controls 102, 104, 106, and 108 rotate about the axes 103, 105, 107, and 109 into one of the positions. The controls are, for example, 20 millimeters long and 10 millimeters in diameter. Of course, the controls may be rotated into any number of positions as needed.

The base 100 can be of any suitable dimension. For example, the base may be 225 millimeters wide, 76.2 millimeters deep, and 25 millimeters thick. The sides of the parallelogram defined by the axes 103, 105, 107, and 109 are approximately 40 millimeters. Thus, the device is compact and can be used with small, hand-held systems. The base 100 can be constructed of any material; however, it is preferred that the base be composed of a hard, resilient material such as plastic.

The user turns a control or controls about the axes to represent alphanumeric characters. The controls are turned simultaneously or nearly simultaneously. Not all controls necessarily need to be turned to represent an alphanumeric character. In particular, a single turned control may represent an alphanumeric character. In this case, all other controls are not turned and return to a default position. Each grouping of control positions represents a control sequence. The turning of the controls produces electrical signals that are detected by sensors in interface circuits.

The device of the present invention may be arranged so that fewer controls need to be turned for more common characters in the English language. For example, the letter "E" may be represented by the turning of a single control, since the letter "E" is one of the more common characters in the English language. Of course, the device of the present invention is not limited to representing alphanumeric characters in the English language. To the contrary, the device can be used to enter characters in any language and may be used to enter non-alphanumeric characters (e.g., special symbols or numbers) as well.

The base 100 can have any number of controls. For example, the base 100 may have two controls. The number of controls and the number of positions that the controls can be turned determines the number of alphanumeric characters that can be represented. The equation $N=S^{NOK}$ is used to determine the number of characters available. In this equation, N represents the number of alphanumeric characters. S represents the number of control states. In other words, s represents the number of positions a control can be turned. Finally, NOK represents the number of controls.

Figure 2:
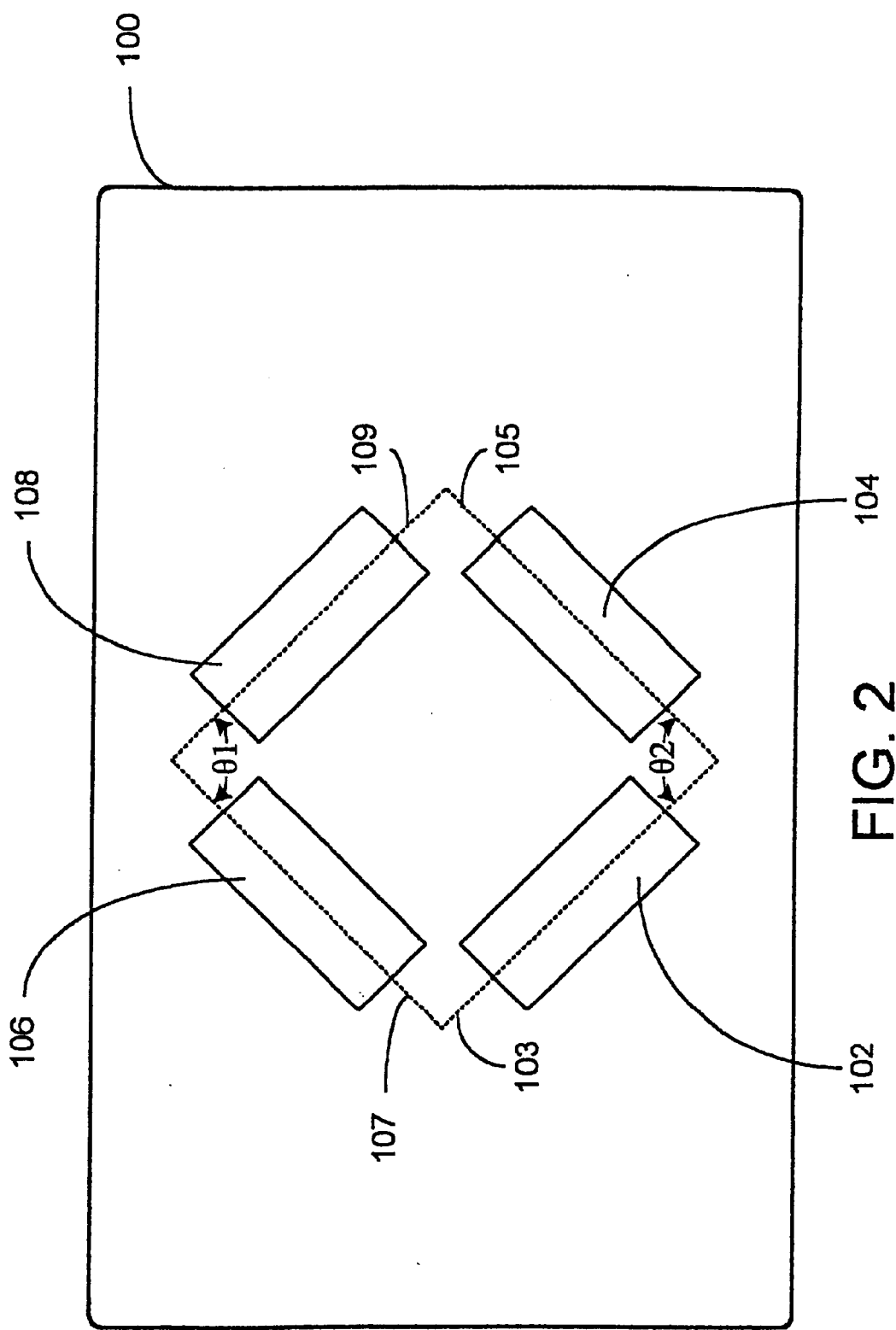
FIG. 2 is a diagram illustrating a top view of a device according to principles of the present invention.

Referring now to FIG. 2, the controls 102, 104, 106, and 108 are arranged in a diamond pattern on the base 100. The axes 103, 105, 107, and 109 are arranged so that axis 103 is perpendicular to axis 105; axis 105 is perpendicular to axis 109; axis 109 is perpendicular to the axis 107; and axis 107 is perpendicular to 103. In an alternate embodiment, the axes 103, 105, 107, and 109 are arranged so that axis 103 is not perpendicular to axis 105; axis 105 is not perpendicular to axis 109; axis 109 is not perpendicular to 107; and axis 107 is not perpendicular to axis 103.

An angle θ1 is formed between the axes 103 and 109 while an angle θ2 is formed between the axes 105 and 107. The angles θ1 and θ2 are ninety degrees. However, the angles θ1 and θ2 can be changed to any value in a range of values to better suit the shape of the hands or the relation of the fingers to the controls.

Figure 3:
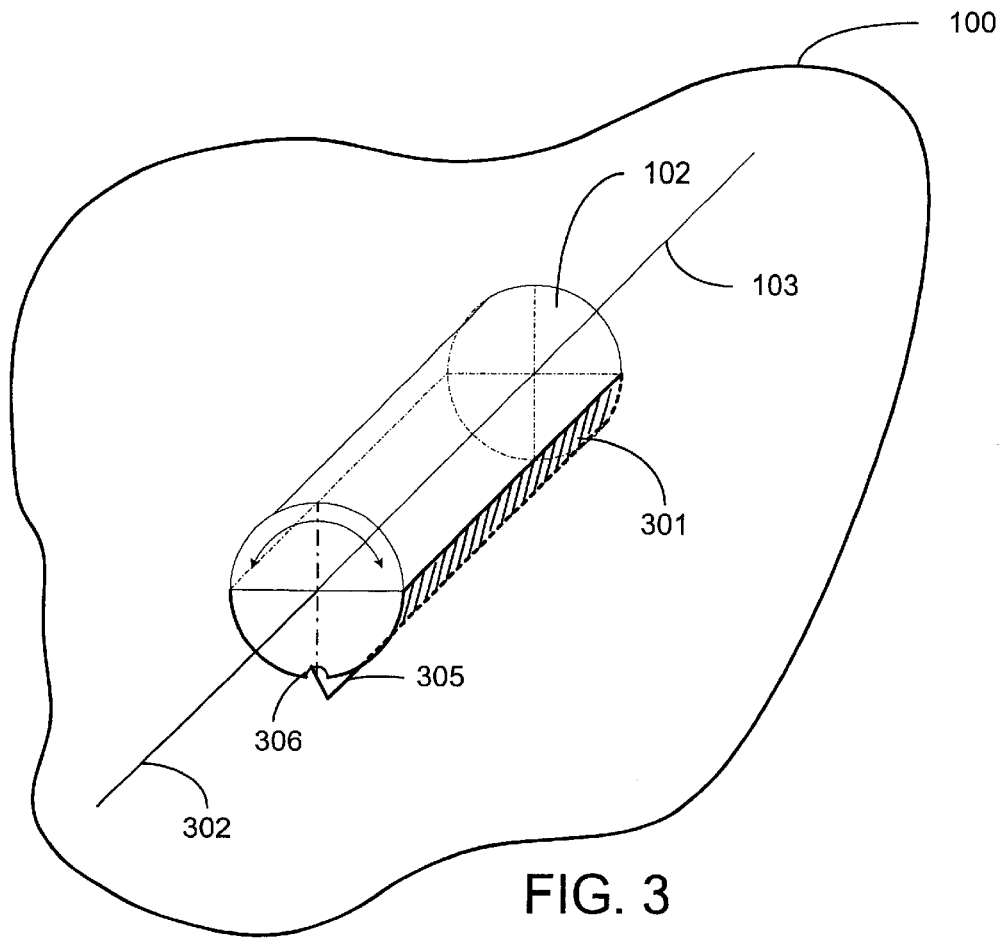
FIG. 3 is a perspective diagram illustrating a control on the device according to principles of the present invention.

Referring now to FIG. 3, the control 102 and its positioning relative to the base 100 is illustrated. The control 102 is held in a well 301. The control 102 rotates in the well 301 and is in contact with the bottom of the well 301 as it rotates.

The control rotates about a wire 302. The bottom of the well may be lubricated with a suitable material to reduce friction and ensure mobility of the control 102. The control 102 may return to its initial position once it has been rotated to a new position. A flexible membrane 305 is coupled to a notch 306 in the control 102. If the control is rotated by a force, the membrane 305 returns the 102 to a central location once the force has been removed. In this case, the control 102 is a cylinder. The cylindrically-shaped control can be replaced by a circular-shaped control, a square control, or any of a variety of other shapes. The cylinder may be rotary encoder. If a non-cylindrical shape is chosen for the control, the direction of rotation of the control may be different than the direction of rotation for a cylindrically-shaped control. For example, if a button-shaped control is used, the direct of rotation may be clockwise and counterclockwise relative to the well, rather than about the axis 103. Other rotation directions are also possible.

Figure 4:
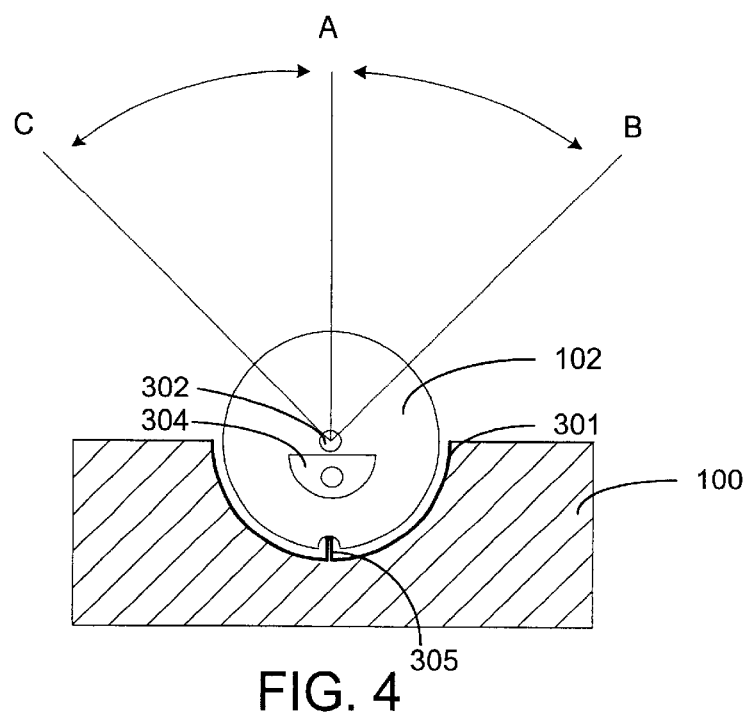
FIG. 4 shows a cross-sectional diagram of one of the controls and device according to principles of the present invention.

Referring now to FIG. 4, the rotation of the controls is illustrated. The control 102 resides in a well 301 in the base 100 and rotates about an axis 103. The control rotates about a wire 302. The control rotates to one of a plurality of predetermined positions. As the control rotates, it communicates with an interface circuit 304. The interface circuit 304 contains a sensor that determines the predetermined position of the control in the well (i.e., where the control has been rotated). The control may return to one of the positions once it has been rotated from its original position. For example, the control may return to position A after being rotated to positions B or C.

Figure 5A:
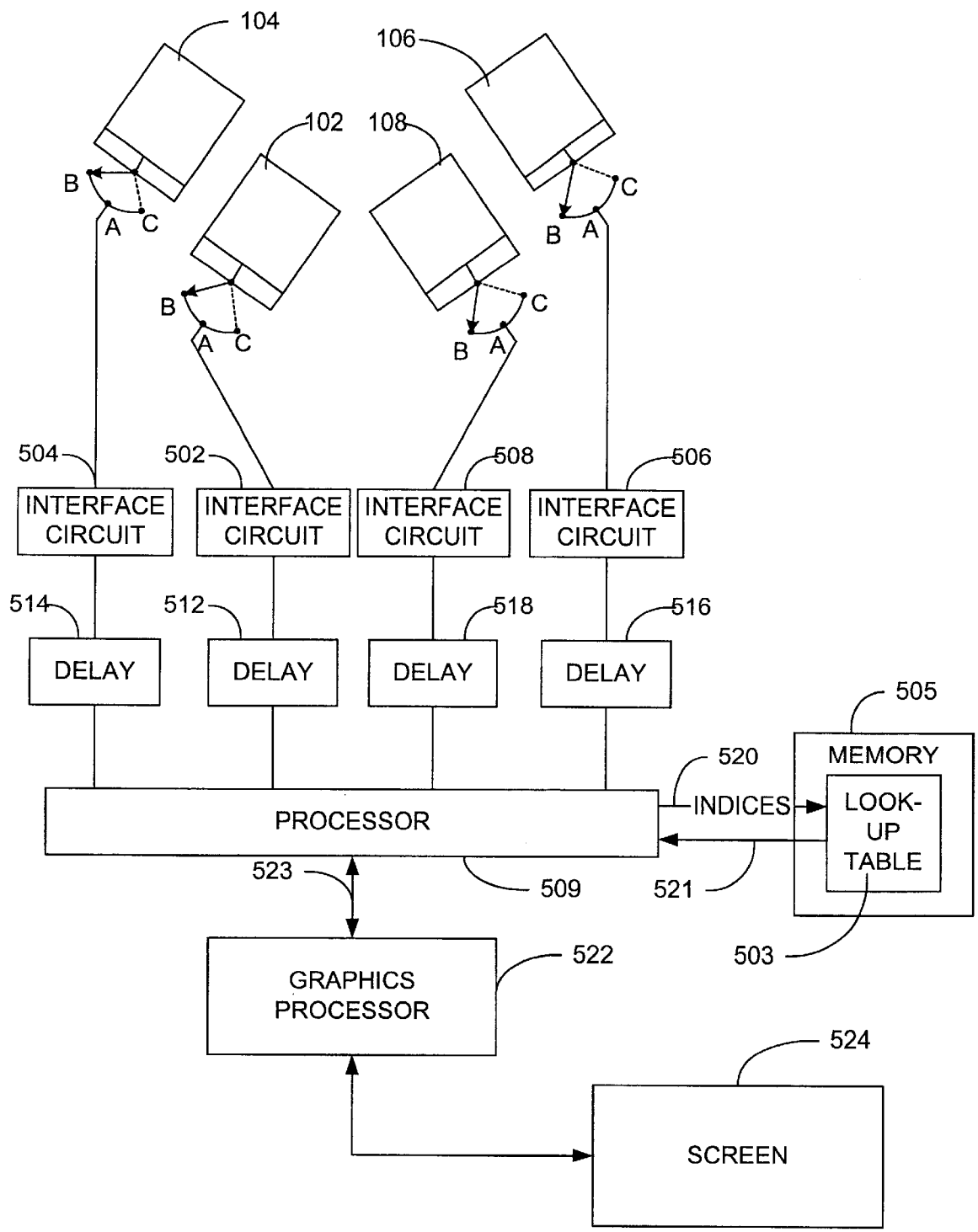
FIG. 5a is a block diagram of a data entry system according to principles of the present invention.

Referring to FIG. 5a, a block diagram of the present invention is illustrated. The controls 102, 104, 106, and 108 are connected to interface circuits 502, 504, 506, and 508, respectively. The interface circuits contain a sensor, which determines the relative position of the key. Each of the controls 102, 104, 106, and 108 can be rotated into one of a plurality of positions A, B, and C. The initial default position is A. In other words, after rotation of the control 102, 104, 106, and 108 to B or C, the control returns to position A.

The purpose of the interface circuits 502, 504, 506, and 508 is to convert the position of the control into an electrical signal representative of the position A, B, or C. For example, if the control 102 is in position B, then a signal representing that the control 102 is in position B is formed in the interface circuit 502. If the cylinder is in position B, then a logic 1 (e.g., a high voltage level) is read by the interface circuit. Also, if the cylinder is in position A, no voltage is read by the interface circuit. Finally, if the cylinder is in position C, then a logic 0 (e.g., a low voltage level) is read by the interface circuit.

The interface circuits 502, 504, 506, and 508 are coupled to a delay elements 512, 514, 516, and 518, respectively. The purpose of the delay elements 512, 514, 516, and 518 is to allow for simultaneous positioning of more than one control by a user. In other words, the reading of the signal is delayed so that other controls can be turned into position.

A processor 509 is coupled to the delay elements 512, 514, 516, and 518. The purpose of the processor 509 is to convert the electrical signals, which represent an alphanumeric character, received from the delay elements into a code. The conversion can be accomplished, for example, by using a look-up table 503. The table resides in a memory 505 coupled to the processor 509. The processor 509 receives the electrical signals from the delay elements 512, 514, 516, and 518, and converts these signals into indices. The indices are transmitted over a lead 520 to the look-up table 503. The system uses the indices to index an entry in the table 503. The entry contains a code, which represents an alphanumeric character. After the system locates the code in the table corresponding to the indices, the code is returned to the processor 509 over a lead 521.

The code, representing an alphanumeric character, can then be processed by other elements in the system. For example, a graphical processor 522 receives the code from the processor 509 over lead 523 and displays the alphanumeric character represented by the code on a screen 524.

Figure 5B:
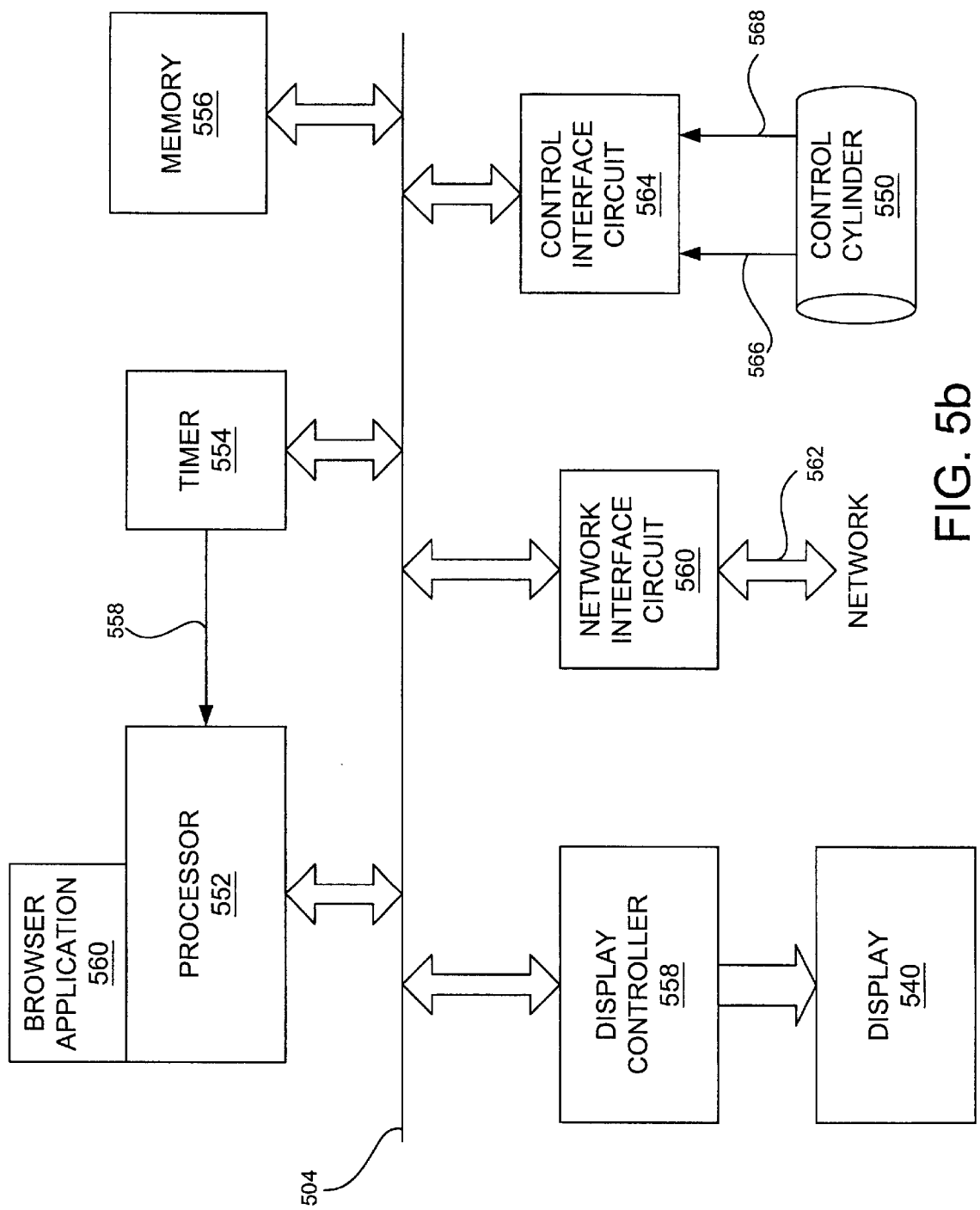
FIG. 5b is a block diagram of the data entry system according to principles of the present invention.

Referring now to FIG. 5b, a functional block diagram illustrating one embodiment of the system for entering data is illustrated. The system is configured to receive user input via the user control cylinder 550 and display information to the user via display 540. The embodiment of a system shown in FIG. 5b includes a processor 552 that is coupled to various peripheral devices through processor bus 504. The peripheral devices coupled to processor 552 include a programmable timer 554, a memory subsystem 556, a display controller 558, a network interface circuit 560, and a control interface circuit 564.

Programmable timer 554 is programmed with a time-out value by processor 552 and, when the time-out value is reached, generates an interrupt signal 558 that is input to the processor. Memory subsystem 556 stores data and executable code for processes running on processor 552, such as browser application 560. Display controller 558 drives a display device, such as the display 540 and receives display updates under the control of processor 552. A network interface circuit 560, such as a network interface card (NIC) or a modem, sends and receives data packets over network connection 562. Control interface circuit 564 receives and decodes the user selection information that is input via control circuit 550. In an alternate embodiment, the processor 552 directly monitors user input via control cylinder 550 through the use of the processor's interrupt scheme.

Figure 5C:
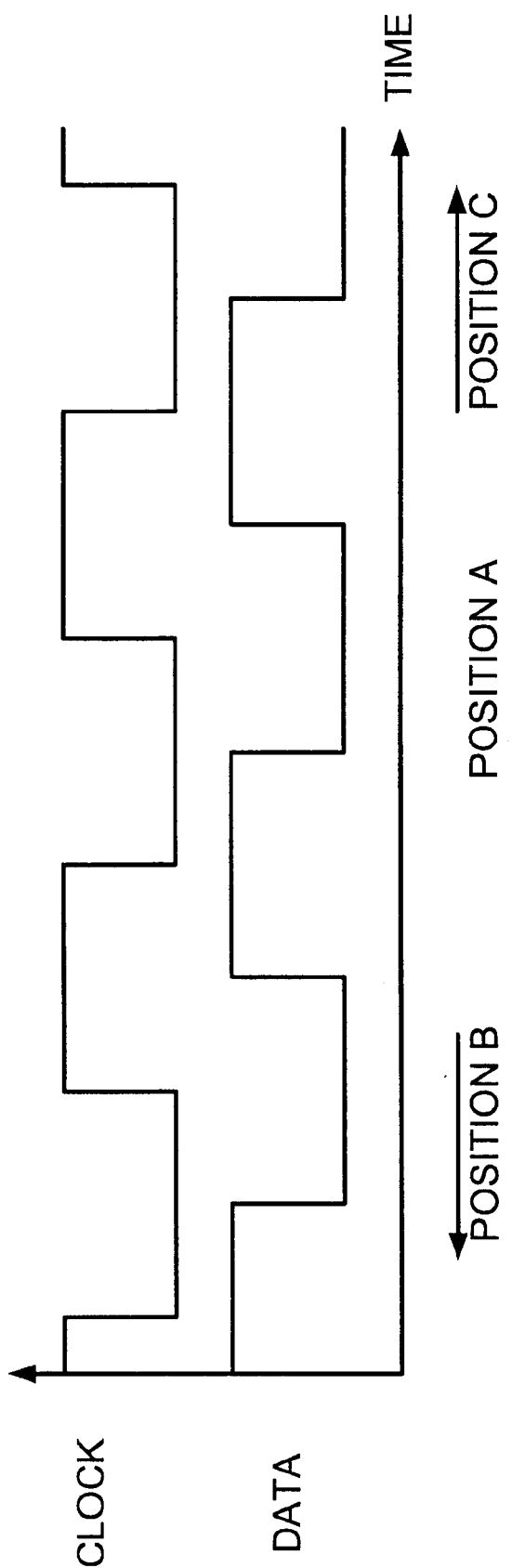
FIG. 5c illustrates a timing diagram.

In the embodiment of FIG. 5b, control cylinder (or control) 550 outputs three signals, a clock signal 566, and a data signal 568. When the user rotates the control cylinder, the clock signal 564 will transition between logic 0 and 1 states. When control interface circuit 564 detects a transition in the clock signal, such as a falling edge, then it checks the value of the data signal 566. If the data signal is a logic 1, then the control cylinder has been rotated in one direction to a first position, e.g., position C in FIG. 4, and when the data signal is a logic 0, then the control has been rotated in the opposite direction, e.g., position B in FIG. 4. The control cylinder returns to position A, as shown in FIG. 4. By counting the number of clock pulses and sensing the data signal value, a count representing the position of the cylinder is maintained by control interface circuit 564. The position value can then be converted to an index value, and the index value used to access a look-up table in the memory 556. A code corresponding to the index is output to the display controller 558 via the bus 504. The display controller 558 then displays alphanumeric character corresponding to the code on display 540. Referring now to FIG. 5c, a timing diagram is illustrated. The waveforms for the clock signal 566 and data signal 568 of FIG. 5b when the user control cylinder 550 is rotated to various positions. The clock and data signals may also be referred to as quadrature signals and one embodiment of the knob interface circuit 564 is a quadrature decoder circuit. When control cylinder is rotated to a first position, e.g. to position C in FIG. 4, the phase of the clock signal 566 leads the phase of the data signal 568 and the data signal is in a logic zero state at the rising edge of the clock signal. When control cylinder 550 is rotated to a second position, e.g. to position B in FIG. 4, then the phase of the data signal 568 leads the phase of the clock signal and the data signal is in a logic one state at the rising edge of the clock signal. Otherwise, the two signals are in phase, e.g., the cylinder control is in position A in FIG. 4.

Figure 6:
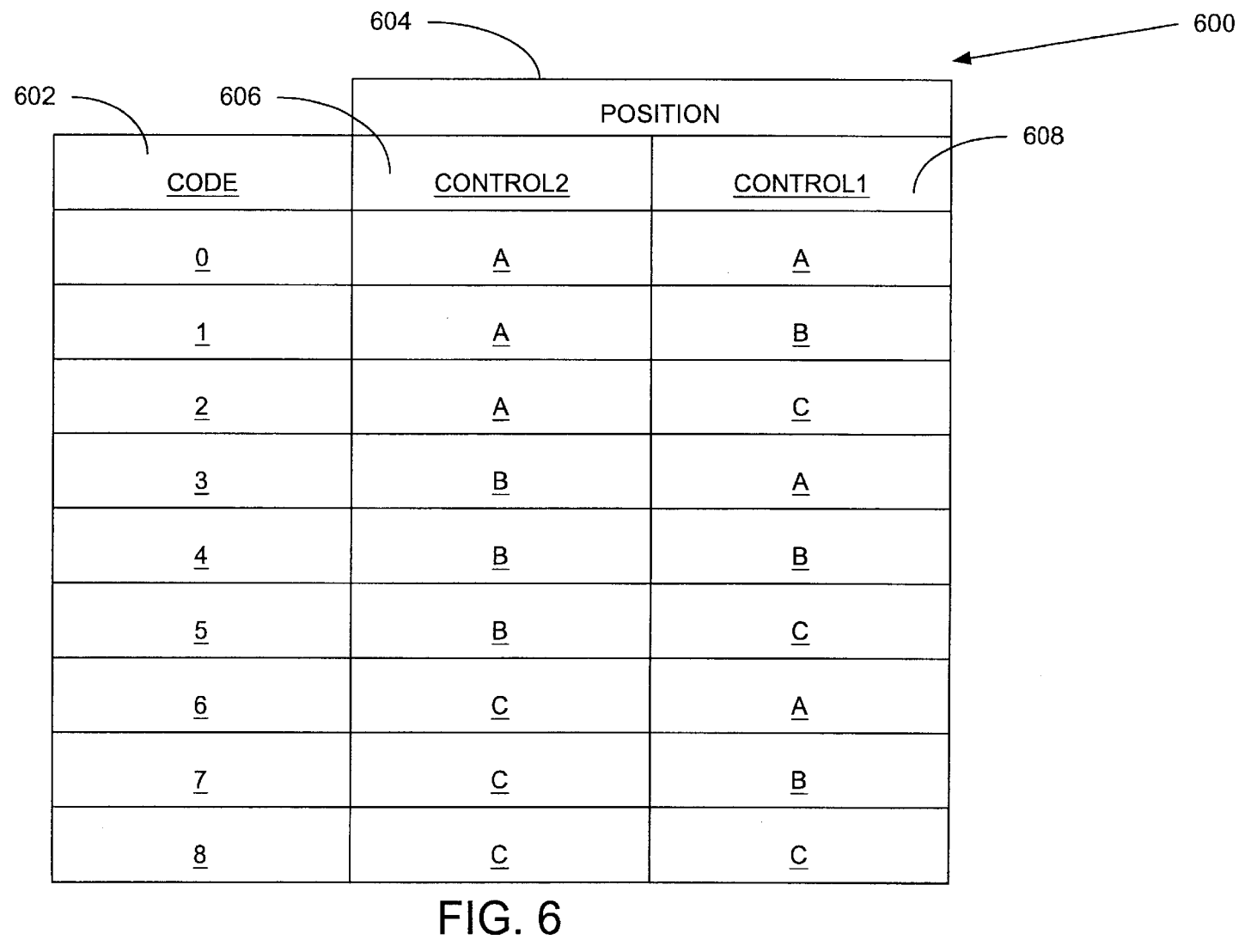

Referring now to FIG. 6, a look-up table 600 comprises a code column 602. The code column 602 comprises a plurality of codes 0 . . . 8. The codes 0 . . . 8 correspond to a specific alphanumeric character. For example, the code 0 may correspond to the character "R". The code 1 may correspond to the character "T".

A column group 604 comprises two position columns 606 and 608. Each position column 606 or 608 represents a particular control. In this case, two controls are represented by "control1" in position column 608 and "control2" in position column 606. Of course, any number of controls may be represented. If more controls are used, more position columns (and more codes) will be used. For example, if four controls are used, four position columns are used and eighty-one different codes are available for use. The entries in each column illustrate the position of a particular control. In this case, the controls can be in positions A, B, or C. A row entry, which includes a position for control1 and control2, represents a control sequence. Each control sequence has a unique, corresponding code.

Figure 7:
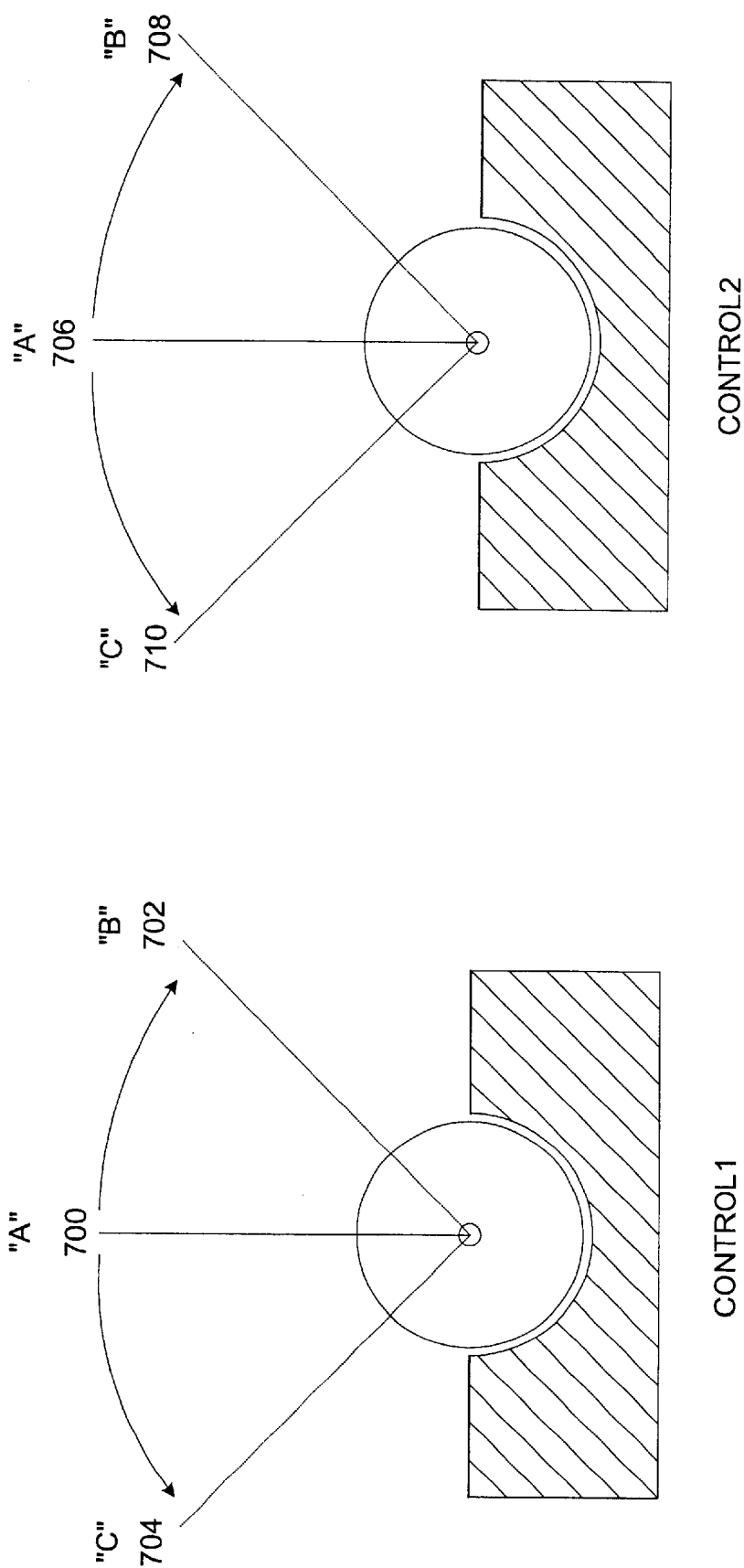
FIG. 7 is a diagram illustrating the positions of two controls according to principles of the present invention.

Referring now to FIG. 7, each of the two controls control1 and control 2 can be rotated into one of three positions. These positions are represented by A, B, and C. A "B" represents that the first control is in a first position 700 and has produced, for example, a positive voltage level. An "A" represents that the first control is in an initial (or second) position 702 and has produced, for example, a neutral or no level. A "C" represents that the first control is in the third position 704 and has produced, for example, a zero voltage level.

The second control can also be moved into one of three positions. These positions are represented by A, B, and C. A "B" represents that the second control is in a first position 706 and has produced, for example, a negative voltage level. An "A" represents that the second control is in its initial (or second) position 708 and has produced, for example, a neutral or no voltage level. A "C" represents that the second control is in the third position 710 and has produced, for example, a zero voltage level.

Figure 8:
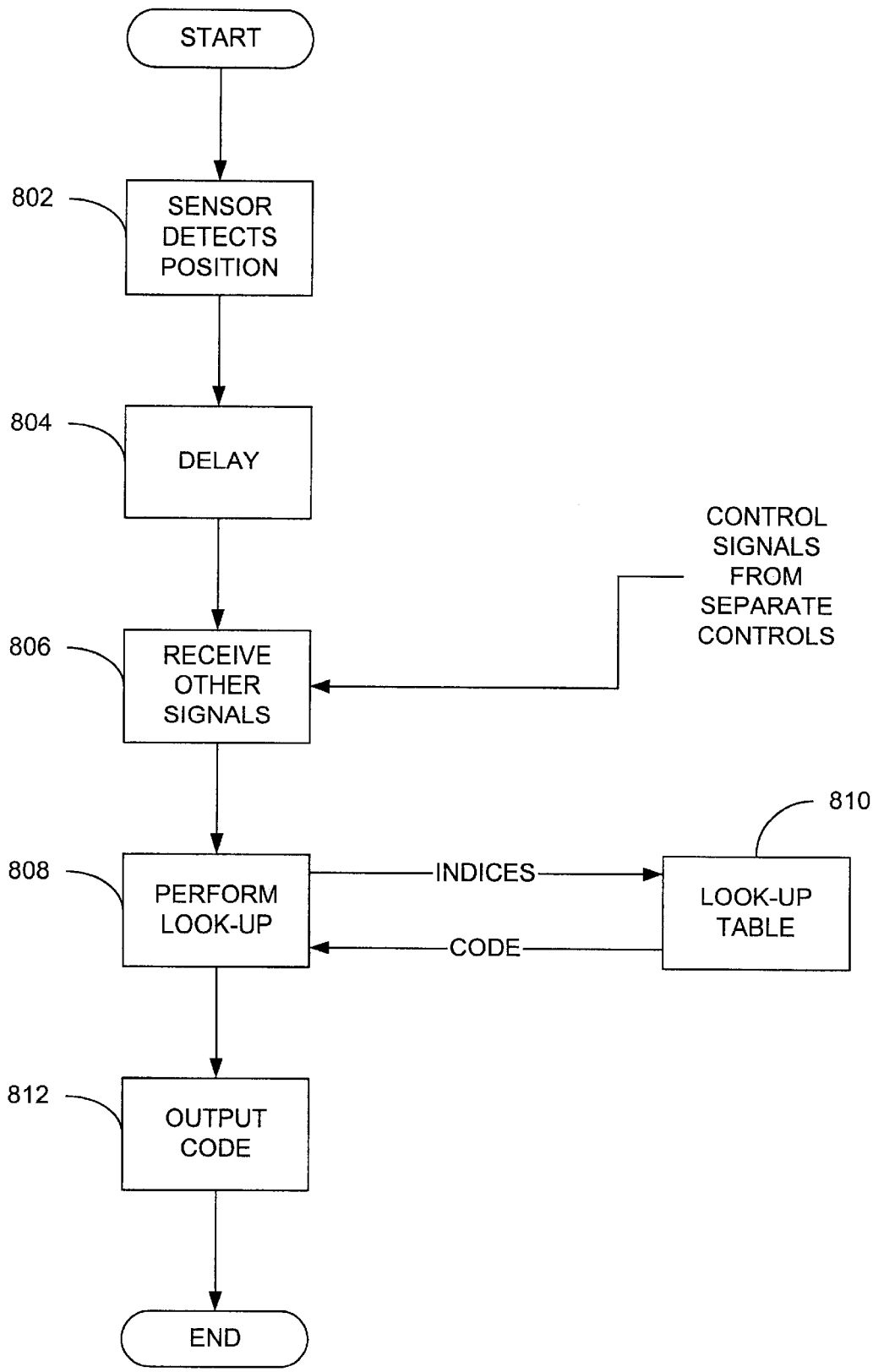
FIG. 8 is a flowchart illustrating the operation of the system according to principles of the present invention.

Referring now to FIG. 8, a flowchart illustrating the operation of the present invention is described. At step 802, the sensor in the interface circuit detects the position of the control. For example, if the control is movable into one of three positions, then the interface circuit detects which of the three positions the control has been positioned. Then, at step 804, the interface circuit delays the reporting of position of the control for a predetermined time period. The purpose of the delay is to allow time for the positioning of the other controls. After the period of the delay, the system assumes that all of the controls have been properly positioned. All controls, which have been rotated, return to their initial position (before rotation).

Then, at step 806, the system receives other signals from other controls. In the case of a system where the controls can be placed in three positions, the signals may be of a negative, neutral, or positive voltage level.

Next, at step 808, the system accesses a look-up table 810 in memory and performs a look-up to determine the alphanumeric character represented by the positions of the controls. A set of indices is created from the positions of the controls so that these indices can be used to perform a look-up in the look-up table 810. A code representing the alphanumeric character is returned and sent to step 812. At step 812, the code is output to other entities that use the code. For example, the code may used by a graphics processor. The graphics processor takes the code and displays the alphanumeric value represented by the code. Other uses of the code are possible.

Figure 9A:
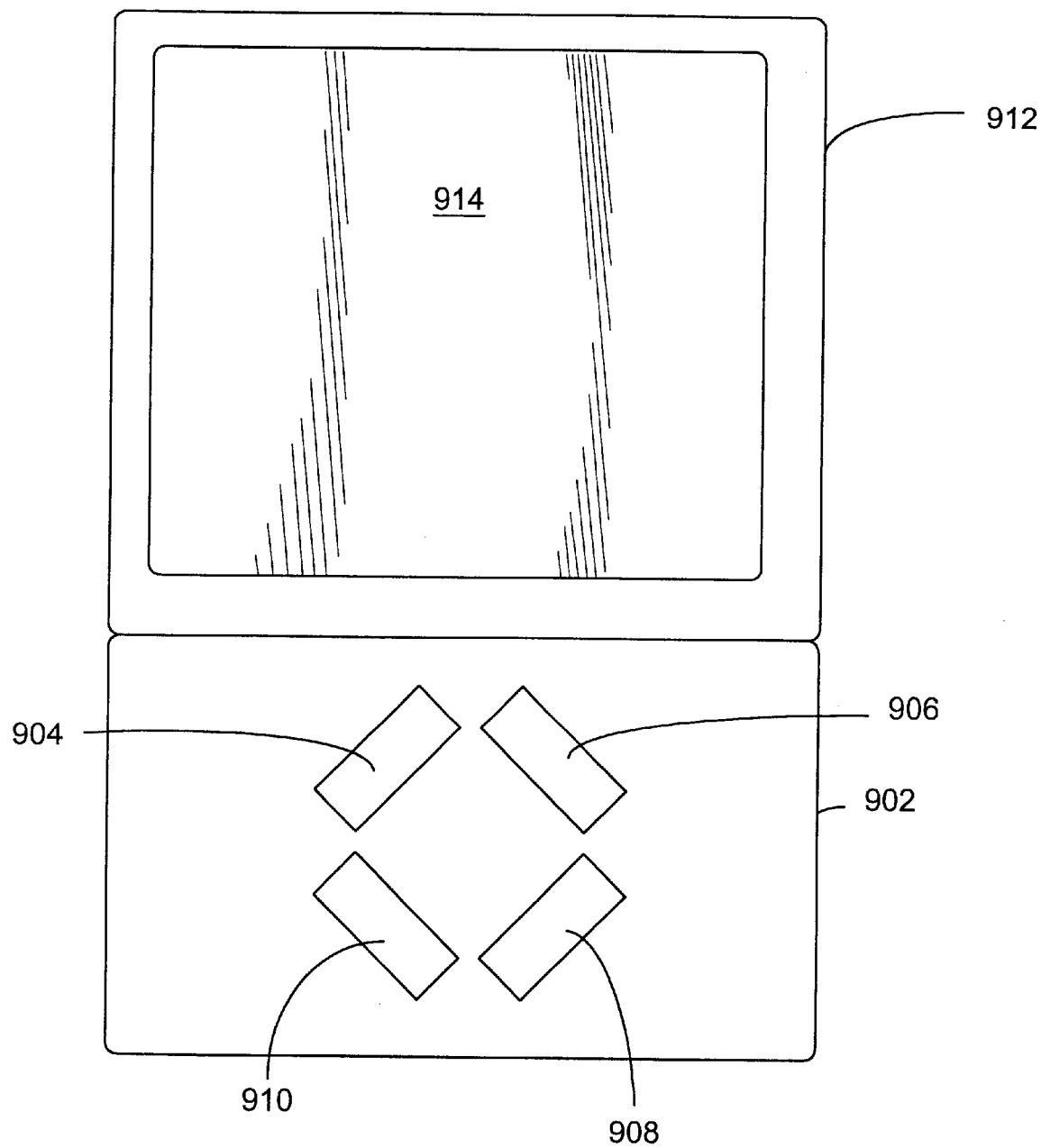
FIG. 9a is a top view of the device and screen arrangement according to principles of the present invention.
Figure 9B:
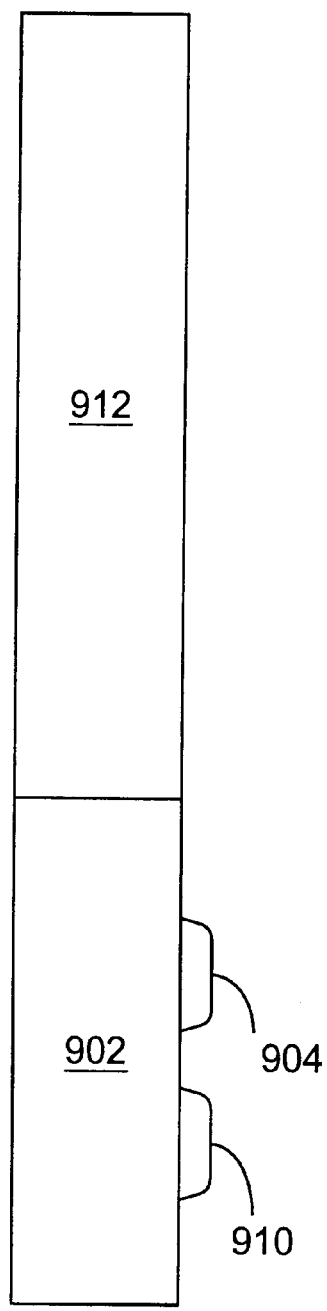
FIG. 9b is a side view of the device and screen arrangement according to principles of the present invention.

Referring now to FIGS. 9a and 9b, a data entry device 902 with controls 904, 906, 908, and 910 is attached to a screen base 912. The screen base 912 contains a screen 914 where alphanumeric characters can be displayed. The device 902 detaches from the screen base 912. Thus, the device 902 and screen base can be stored separately. In one embodiment, the device and screen base are 225 millimeters wide. The screen is 215.9 millimeters wide. The screen base and device are 25 millimeters thick. The device is 76.2 millimeters long and the screen ED, base is 304.8 millimeters long. The screen is 297 millimeters long. Of course, these dimensions are for illustrative purposes only and can be changed depending upon the exact nature of the application.

Figure 10:
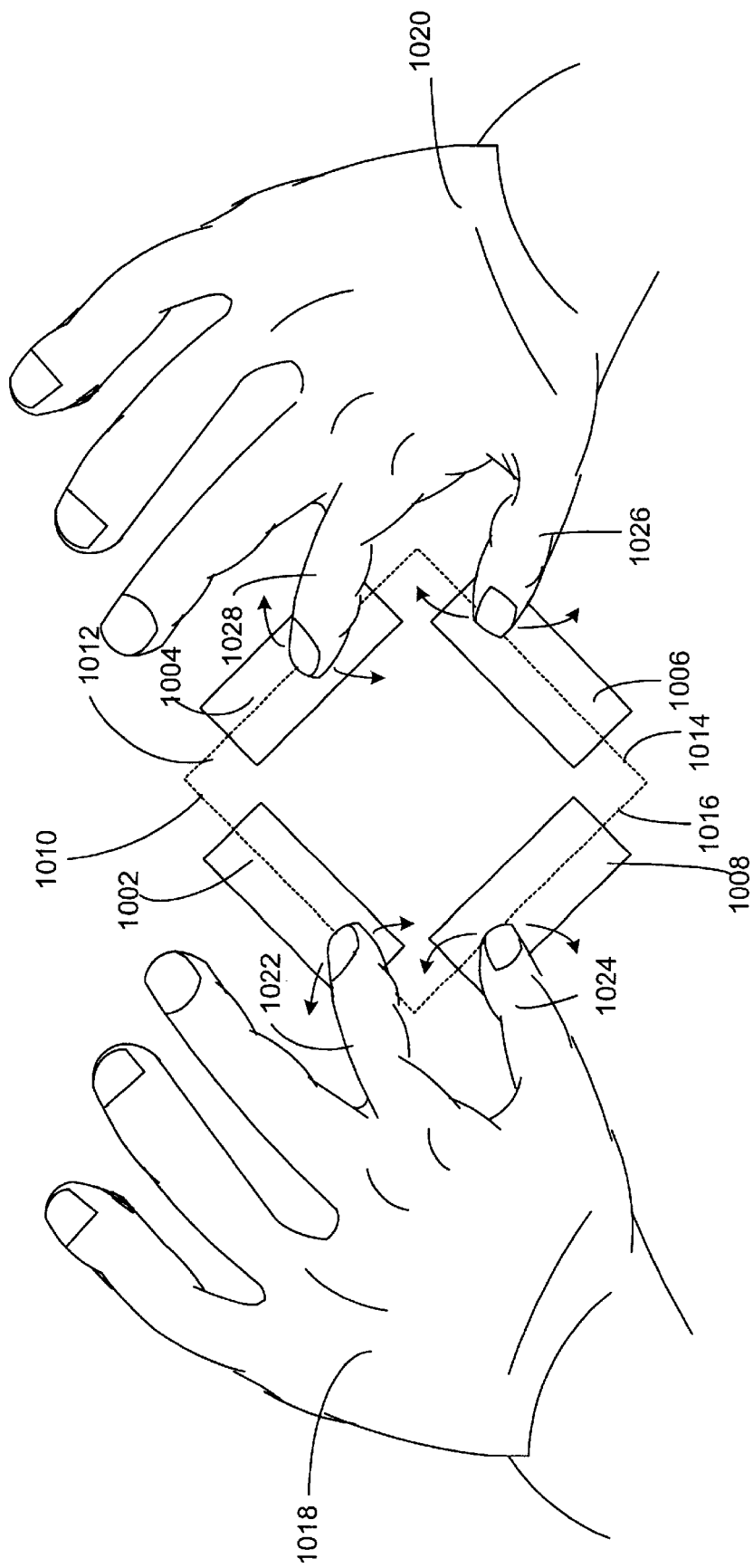
FIG. 10 is a perspective view showing how the controls may be moved on the device according to principles of the present invention.

Referring to FIG. 10, the operation of the device is illustrated. The device comprises controls 1002, 1004, 1006, and 1008. The controls 1002, 1004, 1006, and 1008 run parallel to axes 1010, 1012, 1014, and 1016, respectively. A left hand 1018 of a user is used to position the controls 1002 and 1008. A right hand 1020 is used to position the controls 1004 and 1006.

An index finger 1022 on the left hand 1018 rotates the control 1002 into one of three positions. A thumb 1024 on the left hand 1018 rotates the control 1008 into one of three positions. The user turns the controls 1002 and 1008 in arcs, as shown. The dimensions of the arcs will depend upon the size of the hands of the particular user. In alternative embodiments, any of the controls 1002, 1004, 1006, and 1008 may be rotated into any number of positions.

An index finger 1028 on the right hand 1020 rotates the control 1004 into one of three positions. A thumb 1026 on the right hand 1020 rotates the control 1006 into one of three positions. The user rotates the controls 1002 and 1008 in arcs, as shown. The dimensions of the arcs will depend upon the size of the hands of a particular user.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams. While various elements of the preferred embodiments have been described as being implemented in software, in other embodiments in hardware or firmware implementations may alternatively be used, and vice-versa.

The claims should not be read as limited to the described order or elements unless stated to that effect. Therefore, all embodiments that come within the scope and spirit of the following claims and equivalents thereto are claimed as the invention.

I claim:

1. A system for entering data comprising:
   a base;
   a plurality of rotatable cylindrical controls coupled to said base, wherein said controls are rotated into a plurality of positions to form a plurality of control sequences, each control sequence producing electrical signals representing said control sequence, each of said control sequences corresponding to a selected one of a plurality of alphanumeric characters; and an electrical processor, coupled to said controls, for receiving said electrical signals and determining said selected one of said plurality of alphanumeric characters represented by said signals.

2. A method for representing an alphanumeric character as a code comprising the steps of:

supplying a plurality of rotatable cylinders;

rotating selected ones of said cylinders into a plurality of predetermined positions to form a plurality of control sequences;

supplying an electrical processor;

generating a plurality of electrical signals responsive to said rotation of said selected cylinders;

sending electrical signals representing the positions of said rotatable cylinders to said electrical processor; and converting said plurality of electrical signals into a corresponding code.

3. A device for entering data comprising:

a plurality of controls, said controls positioned along a first axis, a second axis, a third axis, and a fourth axis, wherein said first axis is substantially parallel to and offset from said second axis, and said third axis is substantially parallel to said fourth axis, and said first axis intersects said third axis and said fourth axis, and said second axis intersects said third axis and said fourth axis, said controls movable into a plurality of positions, said controls producing electrical signals representing said positions; and a processor coupled to said plurality of controls and for receiving said electrical signals and determining a code representing said positions.

4. The device of claim 3 wherein said controls are turned substantially simultaneously to represent an alphanumeric character.

5. The device of claim 3 wherein said controls are arranged in a compact configuration.

6. The device of claim 3 further comprising a graphical screen for displaying said alphanumeric characters.

7. The device of claim 3 wherein said first axis is substantially perpendicular to said third axis and said fourth axis, and wherein said second axis is substantially perpendicular to said third axis and said fourth axis.

8. The device of claim 3 wherein said plurality of controls are cylinders and wherein said cylinders are rotatable into an exactly three positions.

9. A method for encoding an alphanumeric character comprising ie steps of:

turning a plurality of controls into a plurality of selected positions to form a plurality of control sequences;

transmitting electrical signals representative of said control sequences;

determining indices which correspond to said electrical signals;

performing a look-up in a table using said indices to obtain a code corresponding to said indices.

10. The method of claim 9 wherein in said step of turning said controls, said controls are turned substantially simultaneously.

11. The method of claim 9 comprising the further step of delaying transmitting said electrical signals for a predetermined time period.

12. A device for entering data comprising:

a plurality of controls disposed along a first, second, third and fourth axis, wherein said first axis is parallel to said second axis, and said third axis is parallel to said fourth axis, and wherein said first axis is perpendicular to said third axis and said fourth axis, and wherein said second axis is perpendicular to said third axis and said fourth axis; wherein each of said controls rotatable into a plurality positions and transmitting an electrical signal representative of said positions;

a processor coupled to said controls; said processor receiving said electrical signals from said processor and creating indices corresponding to said electrical signals; and a memory coupled to said processor, comprising a look-up table, for receiving said indices and returning a code, said code representing an alphanumeric character.

13. The device of claim 12 comprising exactly four controls.

14. The device of claim 12 wherein said controls are cylindrical in shape.

15. The device of claim 12 wherein said controls are turnable and return to an initial position.

16. A device for entering data comprising:

a first control disposed along a first axis, a second control disposed along a second axis, a third control disposed along a third axis and a fourth control disposed along a fourth axis;

wherein said first axis is parallel to said second axis and said third axis is parallel to said fourth axis, and wherein said first axis is perpendicular to said third axis and said fourth axis and wherein said second axis is perpendicular to said third axis and said fourth axis;

each of said controls rotatable into one of three positions and transmitting an electrical signal representative of said positions;

a first delay element coupled to said first control; a second delay element coupled to said second control; a third delay element coupled to said third control; and a fourth delay element coupled to said fourth control, said delay elements receiving said electrical signals from said controls;

a processor coupled to said first delay element, said second delay element, said third delay element, and said fourth delay element; said processor receiving said electrical signals from said first, second, third, and fourth delay elements and creating indices corresponding said electrical signals; and a memory, coupled to said processor, said memory including a look-up table, for receiving said indices and returning a code to said processor in response to receiving said indices, said code representing an alphanumeric character.

* * * * *